United States Patent
Imamura et al.

(10) Patent No.: US 7,657,826 B2
(45) Date of Patent: Feb. 2, 2010

(54) METHOD OF ESTIMATING LIFE OF HEAD, METHOD OF INSPECTING RECORDING MEDIUM, METHOD OF EVALUATING HEAD, AND INFORMATION RECORDING/REPRODUCING APPARATUS

(75) Inventors: Takahiro Imamura, Kawasaki (JP); Kenrou Yamamoto, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 745 days.

(21) Appl. No.: 11/063,690

(22) Filed: Feb. 23, 2005

(65) Prior Publication Data

US 2006/0103960 A1    May 18, 2006

(30) Foreign Application Priority Data

Nov. 18, 2004    (JP)    ............................ 2004-335080

(51) Int. Cl.
    *H08C 25/00*    (2006.01)
(52) U.S. Cl. ..................................... 714/799; 369/78.12
(58) Field of Classification Search ................. 714/799; 360/78.04, 78.06, 78.08, 78.12
    See application file for complete search history.

(56) References Cited

U.S. PATENT DOCUMENTS

| | | | | |
|---|---|---|---|---|
| 5,168,412 | A * | 12/1992 | Doan et al. | 324/454 |
| 5,774,293 | A * | 6/1998 | Stupp | 360/75 |
| 6,008,640 | A * | 12/1999 | Tan et al. | 324/212 |
| 6,100,683 | A * | 8/2000 | Lim et al. | 324/212 |

FOREIGN PATENT DOCUMENTS

| | | |
|---|---|---|
| JP | 1991-037504 A | 2/1991 |
| JP | 1992-355212 A | 12/1992 |
| JP | 1997-106520 A | 4/1997 |
| JP | 1998-010097 A | 1/1998 |
| JP | 1998-027415 A | 1/1998 |
| JP | 2002-319113 A | 10/2002 |
| JP | 2003-323708 A | 11/2003 |
| JP | 2004-296033 A | 10/2004 |

OTHER PUBLICATIONS

Kawakubo et al. Wear Life Prediction of Contact Recording Head, Mar. 2003, IEEE transactions on magnetics, vol. 39, No. 2.*
Kamatani et al. Wear of the MR head in Helical-Scanning Tape Systems, Sep. 1999, IEEE transactions on Magnetics, vol. 35, No. 5.*
Wallash et al.; Thermal Stability Testing of GMR Recording Heads; IEEE Trans. on Magn. vol. 35, No. 5, pp. 2610-2612; Sep. 1999.
Tsu et al.; Degradation of Spin Valve Heads under Accelerated Stress Conditions; IEEE Trans. on Magn. vol. 37, No. 4, pp. 1707-1709; Jul. 2001.
Official Action—Notice of Grant of Patent, mailed by the Japanese Patent Office on Mar. 24, 2009, in connection with corresponding Japanese Patent Application No. 2004-335080. Partial Translation included.

* cited by examiner

*Primary Examiner*—Sam Rizk
(74) *Attorney, Agent, or Firm*—Greer, Burns & Crain, Ltd.

(57) ABSTRACT

A method of estimating life of a head that reads information recorded in a recording medium includes detecting magnitude of an impact due to a contact between the head and the recording medium; and estimating the life of the head based on the magnitude of the impact detected.

18 Claims, 14 Drawing Sheets

METHOD OF ESTIMATING LIFE OF HEAD, METHOD OF INSPECTING RECORDING MEDIUM, METHOD OF EVALUATING HEAD, AND INFORMATION RECORDING/REPRODUCING APPARATUS

BACKGROUND OF THE INVENTION

1. Field of the Invention

The present invention relates to a recording medium on which information is recorded, and a head that reads information recorded in the recording medium, and more particularly, to a method of estimating life of the head and the recording medium.

2. Description of the Related Art

When an information recording and reproducing apparatus (hereinafter, "magnetic disk apparatus"), which uses a magnetic disk as a recording medium to record information (data), reads information from the magnetic disk, it is common to use a magnetic head that uses giant magneto resistive effect from a giant-magneto-resistive (GMR) element or a ferromagnetic tunneling effect from a tunneling-magneto-resistive (TMR) element.

The magnetic disk apparatus is used as a storage apparatus for various systems such as a computer, a personal computer, or a server to perform reading and writing of information repeatedly. However, when the magnetic head is used for a long time, the GMR element or the TMR element degrades and an output of the magnetic head gradually decreases, which may result in occurrence of a data-read error.

Conventionally, various techniques have been proposed regarding the degradation of the magnetic head using the GMR element. For example, A. J. Wakkash N. Cheng, IEEE Trans. Mag. 35-5, 2610-2712 (1999) discloses a technique to cope with the degradation of the GMR head (magnetic head), focused on temperature. In I. F. Tsu, G. a. Burg, and W. P. Wood, IEEE Trans. Mag. 37-4, 1707-1709 (2001), a technique to cope with the degradation of the GMR head (magnetic head), focused on magnetic field, has been disclosed.

In recent years, a recording density in a magnetic disk increases, and a floating amount of a magnetic head decreases to about 10 nanometers. Ideally, the magnetic disk should be flat; however, there is actually a fine undulation on the magnetic disk. When data is read from the magnetic disk with a floating amount of about 10 nanometers, the magnetic head receives an impact from a contact between the magnetic head and the magnetic disk due to the fine undulation on the magnetic disk. Even if a magnitude of the impact is small, a life (degradation) of the magnetic head is influenced by the impact.

In the above conventional techniques, however, the impact due to the contact between the magnetic disk and the magnetic head has not been considered. Therefore, the degradation of the magnetic head cannot be estimated properly.

In a conventional method of inspecting the magnetic disk, in general, the maximum value of the magnitude of the impact that a magnetic disk receives is often used. However, when the frequency of contacts increases, even if the magnitude of each impact is small, the life of the magnetic head is influenced by the impact. Therefore, in the conventional method of inspecting the magnetic disk utilizing the maximum value of the magnitude of the impact, since an accumulation of the magnitude of the impact with time is not taken into consideration, a proper inspection of the magnetic disk can not be performed.

There are various materials used for an element to read data in the magnetic head. Durability against the impact due to the contact between the magnetic disk and the magnetic head varies according to each material or a structure of the magnetic head. In the conventional techniques, however, measuring and evaluating the durability of the magnetic head including the magnitude of the impact between the magnetic disk and the magnetic head have not been considered. Accordingly, a difference in the durability of the magnetic head against the contact between the magnetic head and the magnetic disk cannot be properly evaluated.

SUMMARY OF THE INVENTION

It is an object of the present invention to solve at least the above problems in the conventional technology.

A method of estimating life of a head that reads information recorded in a recording medium, according to one aspect of the present invention, includes detecting magnitude of an impact due to a contact between the head and the recording medium; and estimating the life of the head based on the magnitude of the impact detected.

A method of inspecting a recording medium according to another aspect of the present invention includes detecting magnitude of an impact due to a contact between a head and the recording medium; accumulating the magnitude of the impact detected; and determining whether the recording medium is good, based on the magnitude of the impact accumulated.

A method of evaluating durability of a head, according to still another aspect of the present invention, includes detecting magnitude of an impact due to a contact between the head and a recording medium; and an evaluation process including measuring an output from the head at a predetermined time interval, and calculating an evaluation value indicating the durability of the head, based on the output measured, an initial output of the head, and the magnitude of the impact detected.

An apparatus for recording information on a recording medium and reproducing information from the recording medium, according to still another aspect of the present invention, includes a head that reproduces the information recorded on the recording medium; a contact-impact detecting unit that detects magnitude of an impact due to a contact between the head and the recording medium; and a life-estimation processing unit that estimates life of the head based on the magnitude of the impact detected, and performs at least one of a first process and a second process. The first process is to notify a value indicating the life of the head estimated, and the second process is to notify that the head has reached end of the life.

An apparatus for inspecting a recording medium, according to still another aspect of the present invention, includes a rotation control unit that rotates the recording medium on which information is recorded; a head that is floating or sliding on the recording medium under rotation at a predetermined distance from a surface of the recording medium; a position control unit that moves the head to a predetermined position on the recording medium; a contact-impact detecting unit that detects magnitude of an impact due to a contact between the head and the recording medium; an accumulating unit that accumulates the magnitude of the impact detected; and a determining unit that determines whether the recording medium is good, based on the magnitude of the impact accumulated.

An apparatus for evaluating durability of a head, according to still another aspect of the present invention, includes a contact-impact detecting unit that detects magnitude of an impact due to a contact between the head and the recording medium; and an evaluation processing unit that measures an output from the head at a predetermined time interval, and calculates an evaluation value indicating the durability of the head, based on the output measured, an initial output of the head, and the magnitude of the impact detected.

A computer-readable recording medium according to still another aspect of the present invention stores a program that makes a computer execute the above method of estimating life of a head according to the present invention.

A computer-readable recording medium according to still another aspect of the present invention stores a program that makes a computer execute the above method of inspecting a recording medium according to the present invention.

A computer-readable recording medium according to still another aspect of the present invention stores a program that makes a computer execute the above method of evaluating durability of a head according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained below in detail with reference to the accompanying drawings. However, the present invention is not limited to these embodiments.

According to the embodiments of the present invention, a case that a magnetic disk that records information thereon using magnetism is used as a recording medium, a magnetic head that includes a GMR element to utilize a giant magneto resistive effect is used as a head (for reading data) that reproduces information form the magnetic disk, and magnitude of an impact due to contact between the magnetic head and the magnetic disk is detected by an acoustic emission (AE) signal or a piezoelectric output signal from a piezoelectric element will be explained as an example. However, a recording medium, a head, and detection of magnitude of an impact are not limited to the above. For example, a magnetic head that includes a TMR element to utilize a ferromagnetic tunneling effect may be used as the head, and a head different from the magnetic head may be used. Such a constitution may be employed that the magnitude of an impact may be detected based on the number of contacts of the recording medium and the head, and any means or method which allows detection of the magnitude of an impact due to contact between the recording medium and the head can be used.

Figure 1:
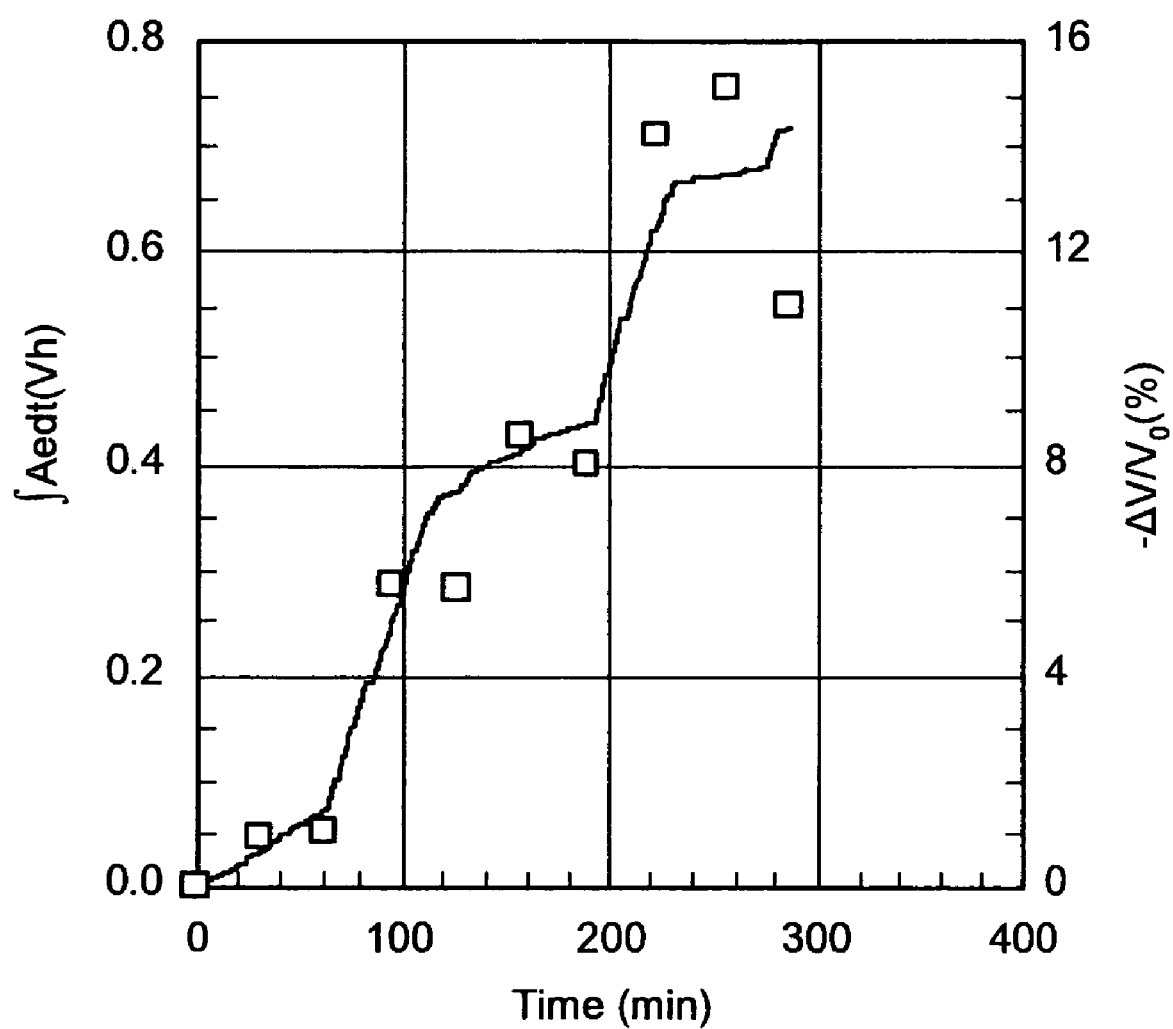
FIG. 1 is a graph of a relationship between an AE signal, an output change amount of a magnetic head, and time.

FIG. 1 is a graph of a relationship between an AE signal, an output change amount of a magnetic head, and time. In FIG. 1, one vertical axis indicates an accumulated value of AE signals ($\int AEdt$), the other vertical axis indicates an output change amount of a magnetic head (which, when an initial output $V_0$ of the magnetic head at time of 0 is defined as 100%, indicates a ratio of decrease in output V of the magnetic head: $-\Delta V/V_0$), and a horizontal axis indicates Time, where a solid line indicates an accumulated value of AE signals, and plot of □ indicates an output change amount of the magnetic head to a magnetic head output at a start time of operation. As shown in FIG. 1, an accumulated value of AE signals increases according to time elapsing and an output change amount increases due to lowering of an output V of the magnetic head. That is, FIG. 1 is a graph of such a fact that an impact due to contact between the magnetic head and the magnetic disk is a factor for lowering an output of the magnetic head.

Here, as "$(-\Delta V/V_0) \propto \int AEdt$", "$(-\Delta V/V_0)/\int AEdt$" is defined as an output degradation coefficient. Measurement results to one magnetic head are shown in FIG. 1, but a tendency similar to that in FIG. 1 can be obtained even regarding measurement results of AE signals to a plurality of magnetic heads and outputs thereof.

Figure 2:
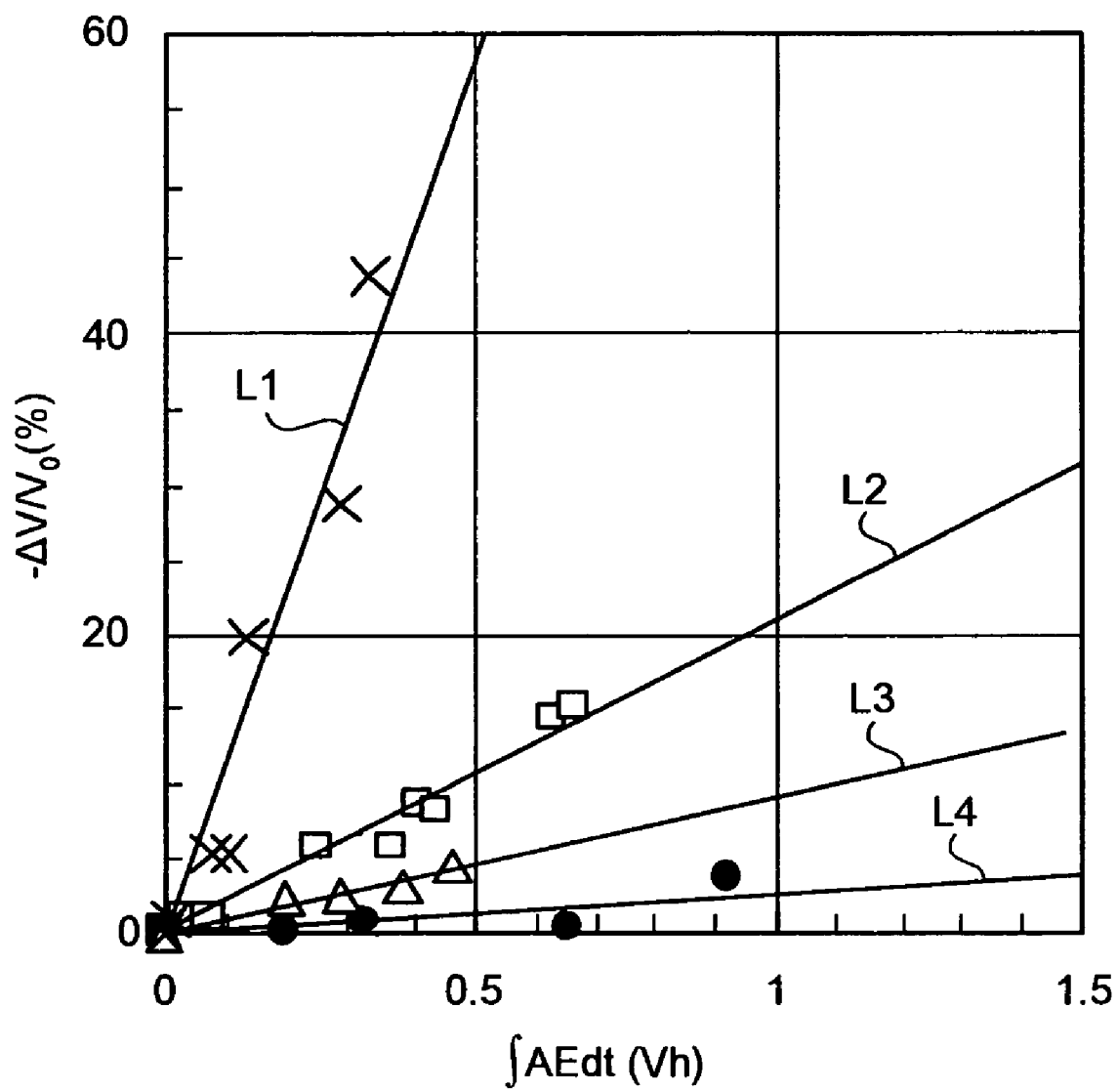
FIG. 2 is a graph of a relationship between the output change amount of the magnetic head and the AE signal.

FIG. 2 is a graph of a relationship between the output change amount of the magnetic head and the AE signal. In FIG. 2, a vertical axis indicates an output change amount of a magnetic head ($-\Delta V/V_0$) and a horizontal axis indicates an accumulated value of AE signals ($\int AEdt$), where a solid line L1 indicates a measurement result of a magnetic head No. 1, a solid line L2 indicates a measurement result of a magnetic head No. 2, a solid line L3 indicates a measurement result of a magnetic head No. 3, and a solid line L4 indicates a measurement result of a magnetic head No. 4. FIG. 2 is a graph of such a fact that output degradation coefficients are different according to differences of magnetic heads. That is, such a fact that output degradation coefficients of a plurality of magnetic heads do not take a fixed value is shown in FIG. 2.

Figure 3:
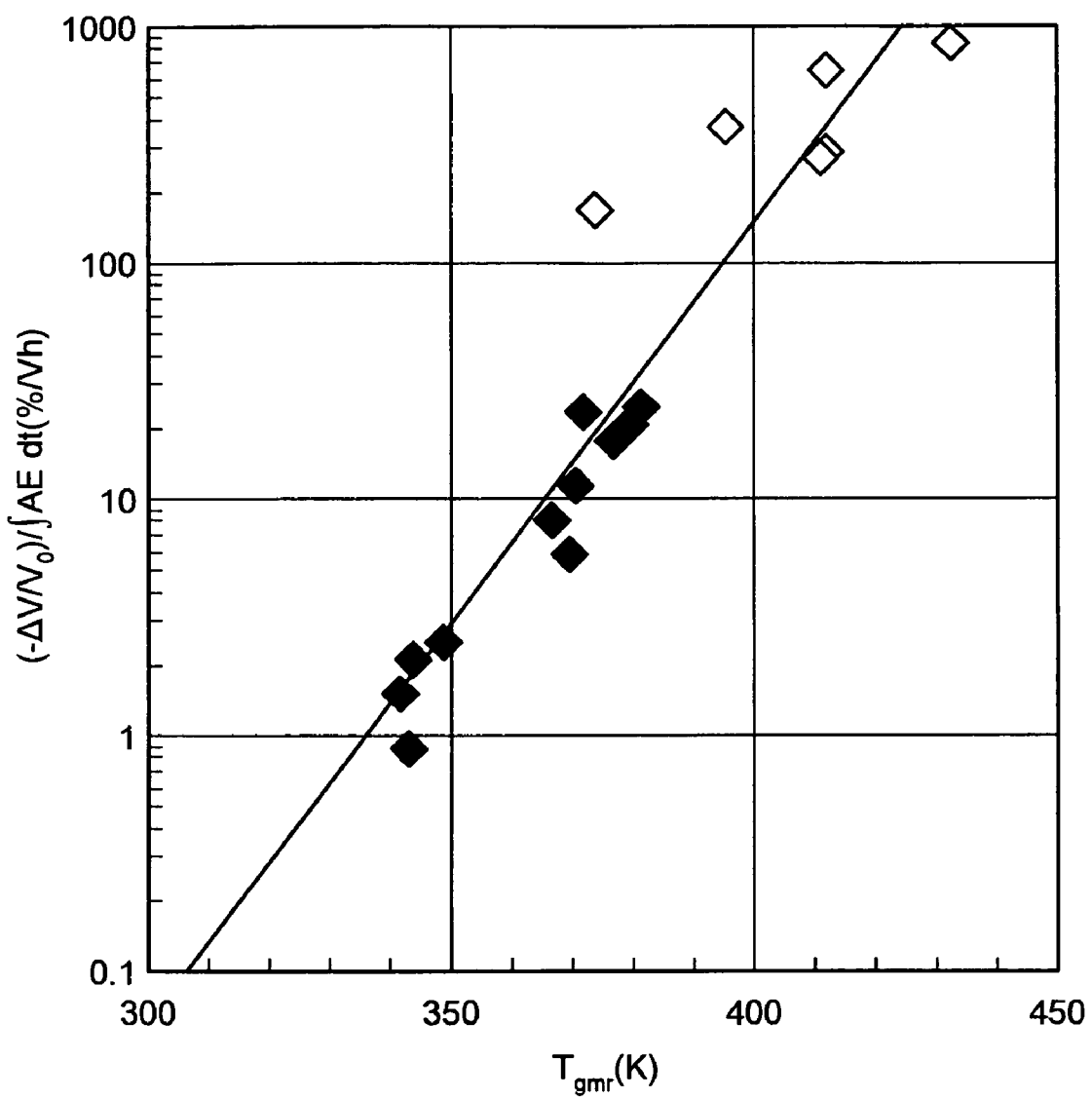
FIG. 3 is a graph of a relationship between a temperature and an output degradation coefficient of the magnetic head.

In general, it has been known that a magnetic head degrades due to heat. Therefore, the inventors have focused on a temperature of a magnetic head (a temperature of a GMR element which is an element to read data for a magnetic head). FIG. 3 is a graph of a relationship between a temperature and an output degradation coefficient of the magnetic head. In FIG. 3, a vertical axis indicates an output degradation coefficient (($-\Delta V/V_0$)/$\int AEdt$), and a horizontal axis indicates an absolute temperature of the magnetic head (Tgmr), where the output change amount is represented by a single logarithm. Plot of "◇" has been obtained by increasing and accelerating a value of current flowing in a magnetic head for reading, and plot of "◆" has been obtained by increasing and accelerating a value of current flowing in a magnetic head for writing. The respective plots are values of individual magnetic heads. A relationship between the output degradation coefficient and the absolute temperature of the magnetic head Tgmr can be represented by $$(-\Delta V/V_o)/\int AEdt = a \times \exp(b \times Tgmr) \quad (1)$$

where, "a" and "b" are constants.

Eq. (1) represents that, even if an impact received by the magnetic head is fine, increase in frequency of impact causes degradation of an output of the magnetic head. In other words, unless all impacts received by the magnetic head are considered, a life of the magnetic head can not be estimated properly. Eq. (1) represents that a sensitivity of output degradation to the output degradation coefficient, i.e., the impact is an exponential function of a temperature of the magnetic head.

Assuming that the temperature of the magnetic head is fixed, an output change amount "$-\Delta V/V_0$" can be obtained from Eq. (1), as $$-\Delta V/Vo = a \times \exp(b \times Tgmr) \times \int AEdt \quad (2)$$

Considering a temperature change of the magnetic head, the output change amount "$-\Delta V/V_0$" can be obtained from Eq. (1), as $$\int (-\Delta V/Vo)dt = \int (a \times \exp(b \times Tgmr) \times AE)dt \quad (3)$$

When an allowable value (a threshold for determining the end of life) of the output change amount of the magnetic head and an absolute temperature of the magnetic head are set in advance, the end of the life of the magnetic head (the output change amount) can be estimated by measuring magnitude of an impact due to contact between a magnetic head and magnetic disk (Eq. (2)).

By setting the allowable value for the output change amount of the magnetic head in advance and measuring the magnitude of an impact due to contact between a magnetic head and a magnetic disk and a temperature of the magnetic head, the end of life of the magnetic head including the temperature change of the magnetic head can be estimated according to Eq. (3).

Figure 4:
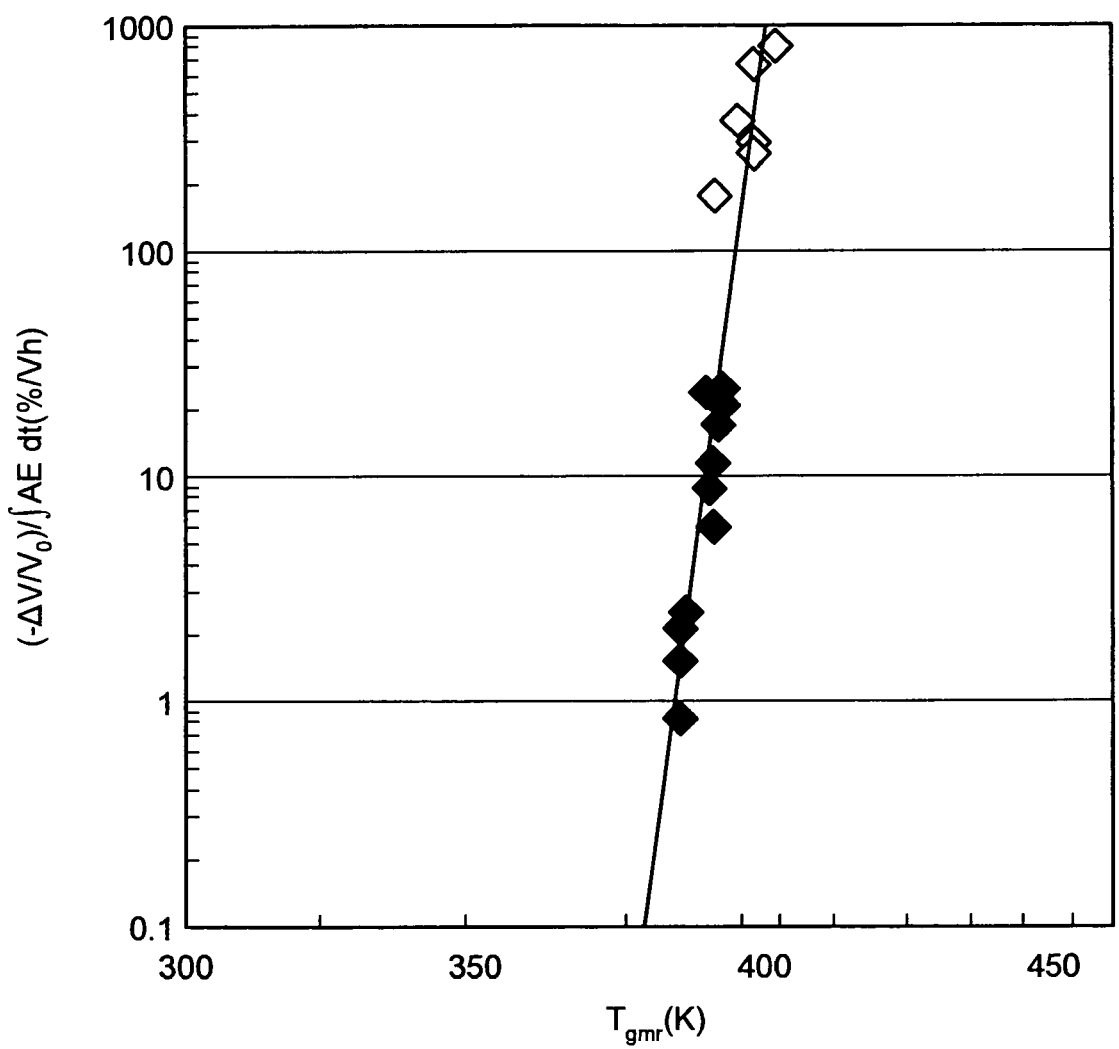
FIG. 4 is a graph of a relationship between a temperature and an output degradation coefficient of the magnetic head.

FIG. 4 is a graph of a relationship between a temperature of the magnetic head and the output degradation coefficient with an approximate Eq. different from Eq. (1), where the temperature of the magnetic head and the output degradation coefficient are represented by double logarithm. Plot of "◇" has been obtained by increasing and accelerating a value of current flowing in a magnetic head for reading, and plot of "♦" has been obtained by increasing and accelerating a value of current flowing in a magnetic head for writing. The respective plots are values of individual magnetic heads. In FIG. 4, output degradation coefficients are distributed substantially on a straight line. A relationship between the output degradation coefficient and the absolute temperature Tgmr of the magnetic head can be represented by $$(-\Delta V/\Delta Vo)/\int AEdt = a \cdot Tgmr^b \quad (4)$$

where, "a" and "b" are constants.

Like Eq. (1), Eq. (4) represents that, even if magnitude of an impact received by the magnetic head is fine, increase in frequency of impact causes degradation of an output of the magnetic head and the output degradation coefficient is a function of the temperature of the magnetic head.

Regarding the output change amount "$-\Delta V/V_0$", the following Eq. (5) can be obtained from Eq. (4).

$$\int (-\Delta V/Vo)dt = \int (AE \times a \times Tgmr^b)dt \quad (5)$$

By setting the allowable value of the output change amount of the magnetic head and the absolute temperature of the magnetic head in advance, measuring magnitude of an impact due to contact between a magnetic head and a magnetic disk, or by setting the allowable value of the output change value of the magnetic head in advance and measuring magnitude of an impact due to contact between the magnetic head and the magnetic disk and temperature of the magnetic head, the end of life of the magnetic head can be estimated according to Eq. (5).

Figure 5:
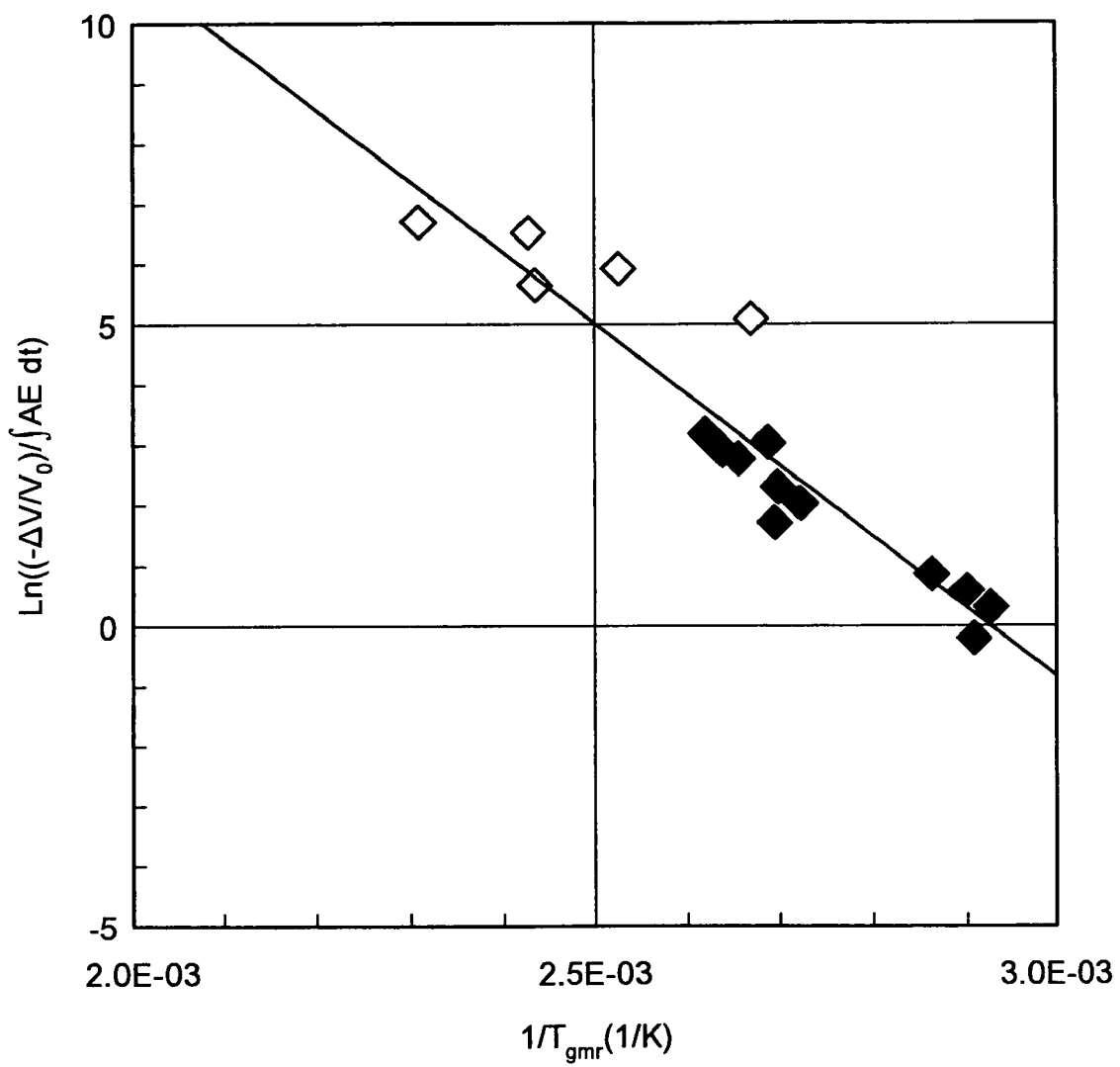
FIG. 5 is a graph of a relationship between a temperature and an output degradation coefficient of the magnetic head.

FIG. 5 is a graph of a relationship between a temperature of a magnetic head and an output degradation coefficient with an approximate equation different from Eq. (1) and Eq. (4), where a vertical axis represents the output degradation coefficient with a natural logarithm and a horizontal axis represents a function of a reciprocal number of an absolute temperature of a magnetic head. Plot of "◇" has been obtained by increasing and accelerating a value of current flowing in a magnetic head for reading, and plot of "♦" has been obtained by increasing and accelerating a value of current flowing in a magnetic head for writing. The respective plots are values of individual magnetic heads. A relationship between the output degradation coefficient and the absolute temperature Tgmr of the magnetic head can be represented by $$\ln((-\Delta V/Vo)/\int AEdt) = a - b \times (1/Tgmr) \quad (6)$$

where, "a" and "b" are constants. Similarly, Eq. (6) represents that, even if an impact received by the magnetic head is fine, increase in frequency of impact causes degradation of an output of the magnetic head and the output degradation coefficient is a function of the temperature of the magnetic head.

Regarding the output change amount "$-\Delta V/V_0$", the following Eq. (7) can be obtained from Eq. (6).

$$-\Delta V/Vo = \int (AE \times \exp(a - b \times (1/Tgmr))dt \quad (7)$$

By setting the allowable vale of the output change amount of the magnetic head and the absolute temperature of the magnetic head in advance, measuring strength of impact due to contact between a magnetic head and a magnetic disk, or by setting the allowable value of the output change amount of the magnetic head in advance and measuring magnitude of an impact due to contact between the magnetic head and the magnetic disk and temperature of the magnetic head, the end of life of the magnetic head can be estimated according to Eq. (7).

In the head life estimating method according to the present invention, from a viewpoint that an output degradation rate of a magnetic head is due to magnitude of an impact due to contact between the magnetic head and the magnetic disk received by a magnetic head and a temperature of the magnetic head, a life of the magnetic head is estimated based on the magnitude of an impact due to contact between the magnetic head and the magnetic disk and the temperature of the magnetic head.

Each of Eqs. (1), (4), and (6) shows that the output degradation coefficient is the function of the temperature of the magnetic head and, even if an impact due to contact between a magnetic head and a magnetic disk is fine, increase in frequency of impact causes degradation of an output of the magnetic head. Since a magnetic disk with many undulations imparts many impacts on a magnetic head, the impacts cause degradation of the magnetic head.

In general, when inspection about goodness and badness of a magnetic disk is performed, a piezoelectric output signal from a piezoelectric element is used as magnitude of an impact due to contact between a magnetic disk and a magnetic head, and the maximum value of the piezoelectric output signal in a one turn of a truck on the magnetic disk is used. However, as shown in Eqs. (1), (4), and (6), even if the magnitude of an impact is fine, increase in frequency of occurrences of impact affects the end of life of the magnetic head. Therefore, in an inspecting method using the maximum value of the piezoelectric output signal, since an effect of accumulation of strengths of impacts along a time axis is not considered, a proper inspection about goodness and badness of a magnetic disk can not be performed.

When a magnetic disk is inspected, since strengths of impacts over a long time can not be accumulated, an average value (a plane average value) of strengths of impacts of the magnetic disk is used. Here, the previous Eq. (1) is applied to the magnetic disk and the piezoelectric output signal is used as the magnitude of an impact instead of the AE signal. When a piezoelectric output signal is represented as PZT, an initial output of the magnetic head to the magnetic disk is represented as $V_0$, an allowable output of the magnetic head after degradation is represented as V, and a temperature of the magnetic head is represented as Tgmr, a degradation coefficient can be represented by $$(-\Delta V/V_0)/\int PZT dt = a \exp(b \times Tgmr) \quad (8)$$

When a usable time of a magnetic head to the magnetic disk is represented as L, and an average value of piezoelectric output signals is represented as PZTave, an accumulated value $\int PZT dt$ of the piezoelectric output signal can be represented by $$\int PZT dt = PZTave \times L \quad (9)$$

The usable time L can be represented from Eqs. (8) and (9), as $$L = (-\Delta V/V_0)/(PZTave \times (a \exp(b \times Tgmr))) \quad (10)$$

The average value PZTave of the piezoelectric output signals can be represented by $$PZTave = (-\Delta V/V_0)/(L \times a \exp(b \times Tgmr)) \quad (11)$$

The usable time L can be represented from Eqs. (4) and (9), as $$L = (-\Delta V/V_0)/(PZTave \times a \times Tgmr^b) \quad (12)$$

The average value PZTave of the piezoelectric output signals can be represented by $$PZTave = (-\Delta V/V_0)/(L \times a \times Tgmr^b) \quad (13)$$

The usable time L can be represented from Eqs. (6) and (9), by $$L = (-\Delta V/V_0)/(PZTave \times \exp(a - b \times (1/Tgmr))) \quad (14)$$

The average value PZTave of the piezoelectric output signals can be represented by $$PZTave = (-\Delta V/V_0)/(L \times \exp(a - b \times (1/Tgmr))) \quad (15)$$

By determining the temperature Tgmr, the usable time L, and an allowable value of the output change amount "$-\Delta V/V_0$" that are usage conditions for a magnetic head, the average value PZTave of the piezoelectric output signals is determined according to Eqs. (11), (13), and (15). Accordingly, when an average value of piezoelectric output signals corresponding to strengths of impacts due to contact between a magnetic head and a magnetic disk to be inspected, which is obtained when the magnetic head is moved from an outer periphery of the magnetic disk to an inner periphery thereof during inspection, is equal to or less than an average value PZTave of piezoelectric output signals which are calculated using Eq. (11), (13), or (15), it can be determined that the usable time L can be satisfied.

In the recording medium inspecting method according to the present invention, considering that the output degradation rate of the magnetic head is caused by the magnitude of an impact due to contact between the magnetic head and a magnetic disk that is a recording medium received by the magnetic head and the temperature of the magnetic head, such a constitution is employed that, when the magnitude of an impact from the magnetic disk to the magnetic head due to contact between the magnetic disk and the magnetic head is equal to or less than a predetermined value, the magnetic head can satisfy a desired usable time, so that the recording medium can be determined as goodness.

As a material for the GMR element for the magnetic head, there are various kinds of materials such as InSb, InAs, GaAs, or InP, and output degradation amounts due to magnitude of an impact due to contact between a magnetic disk and a magnetic head are different according to materials to be used. When a magnetic head is developed or a magnetic head used in a magnetic disk apparatus is selected, it is necessary to evaluate a degree of influence of magnitude of an impact due to contact between a magnetic disk and a magnetic head.

The left-hand side (the output degradation coefficient "$(-\Delta V/V_0)/\int AE dt$") of Eqs. (1), (4), and (6) represents durability of output degradation of a magnetic head to an AE signal, and the right-hand side represents that the output degradation coefficient is the function of the temperature of the magnetic head. Assuming that the temperature of the magnetic head is fixed, the constants "a" and "b" in Eqs. (1), (4), and (6) become coefficients determining material of a GMR element or a structure of an element. That is, with temperatures of different GMR elements (temperatures of different magnetic heads) a fixed to a predetermined value, by measuring output degradation coefficients of the magnetic heads and comparing the output degradation coefficients measured, differences in durability to impacts due to contacts of the magnetic heads and a magnetic disk can be evaluated.

In the head evaluating method according to the present invention, considering that the output degradation coefficient is the function of the temperature of the magnetic head, such a constitution is employed that durability to magnitude of an impact due to contact between the magnetic head and the magnetic head is evaluated based on the output degradation coefficient measured while the temperature of the magnetic head is kept at any fixed value or the magnetic head is kept at a plurality of level temperatures.

Figure 6:
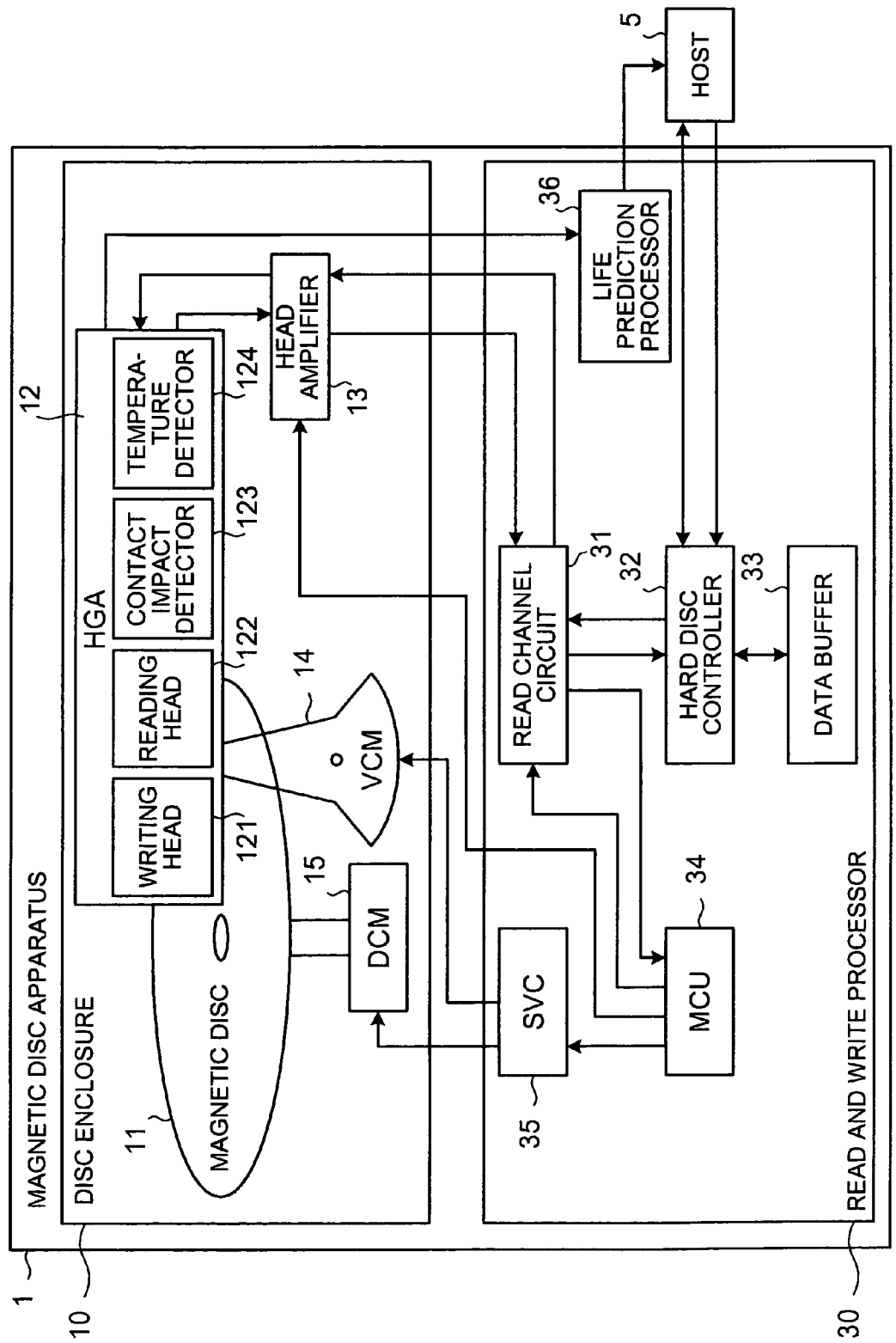
FIG. 6 is a block diagram of a magnetic disk apparatus according to a first embodiment of the present invention.

FIG. 6 is a block diagram of a magnetic disk apparatus according to a first embodiment of the present invention. A magnetic disk apparatus 1 shown in FIG. 6 is controlled by a host 5 which is an upper apparatus such as a personal computer or a server using the magnetic disk apparatus 1 as a storage device.

The magnetic disk apparatus 1 is provided with a disk enclosure (DE) 10 and a reading and writing processor 30. The DE 10 includes a magnetic disk 11 that records information (data) from the host 5 therein; a head gimbal assembly (HGA) 12 including a writing head 121 that records information into the magnetic disk 11, a reading head 122 that is constituted of a GMR element for reading data stored in the magnetic disk 11, a contact impact detector 123 that detects magnitude of an impact due to contact between the magnetic disk 11 and the reading head 122 as an AE signal, and a temperature detector 124 that detects a temperature of the reading head; a head amplifier 13 that controls a writing current supplied to the writing head 121 and amplifies magnetization waveform of the reading head 122, a voice coil motor (VCM) 14 that controls a position of the reading head 122 or the writing head 121: and a DC motor (DCM) 15 that rotates the magnetic disk 11. The reading and writing processor 30 includes a read channel circuit 31 that performs predetermined coding processing on data recorded in the magnetic disk 11 and performs predetermined decoding processing on data read from the magnetic disk 11; a hard disk controller 32 that performs processing regarding error correction on data; a data buffer 33 that stores data recorded in the magnetic disk 11 and data read from the magnetic disk 11, a micro controller unit (MCU) 34 that produces control information for controlling the DCM 15, the VCM 14, and the head amplifier 13, a serve controller (SVC) that controls the DCM 15 and the VCM 14 based on the control information produced by the MCU 34, and a life estimation processor 36 that estimates the end of life of the reading head 122 based on magnitude of an impact detected by the contact impact detector 123 and a temperature of the magnetic disk 11 measured by the temperature detector 124.

Figure 7:
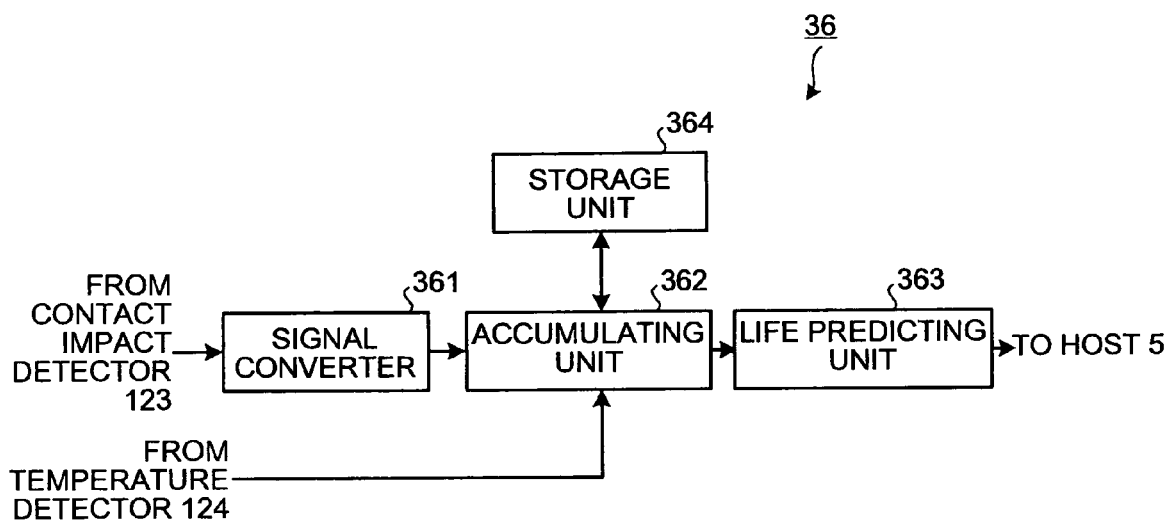
FIG. 7 is a block diagram of a life estimation processor according to the first embodiment.

FIG. 7 is a block diagram of the life estimation processor 36 shown in FIG. 6. The life estimation processor 36 is provided with a signal converter 361 that converts a high frequency AE signal outputted from the contact impact detector 123 into a low frequency signal, an accumulating unit 362 that performs a predetermined arithmetic operation using the temperature of the reading head 122 detected by the temperature detector 124 and the low frequency AE signal converted by the signal converter 361 to calculate output change amounts of the reading head 122 and accumulate the output change amounts calculated, a life estimating unit 363 that estimates the end of life of the reading head 122 based on the output change amounts accumulated by the accumulating unit 362 and the predetermined allowable value for the reading head 122, and a storage unit 364 that is constituted of a non-volatile memory for storing the output change amounts accumulated by the accumulating unit 362.

The magnetic disk apparatus 1 floats the writing head 121 and the reading head 122 on the rotating magnetic disk 11, so that the magnetic disk 11 is magnetized by the writing head 121 at a time of writing and a magnetism signal is read from magnetization of the magnetic disk 11 by the reading head 122 to reproduce data recorded in the magnetic disk 11 at a time of reading.

Tracks on the magnetic disk 11 are classified to servo information indicating a position of the writing head 121 or the reading head 122, and a data section in which data is stored. A servo signal read by the reading head 122 is decoded into position information by the read channel circuit 31, and the MCU 34 controls the VCM 14 via the SVC 35 such that the writing head 121 or the reading head 122 is positioned on a track accurately based on the position information.

When receives writing instruction from the host 5, the hard disk controller 32 stores the writing instruction and data inputted from the host 5 into the data buffer 33. The hard disk controller 32 calculates a physical track position on the magnetic disk 11 from a logical block address (LBA) included in the writing instruction. The hard disk controller 32 outputs address information which is the calculated physical track position to the MCU 34.

The MCU 34 outputs head position control information that moves the head to a position corresponding to a track number of the address information to the SVC 35. The SVC 35 determines a current value for controlling the VCM 14 to move the VCM 14 and position the writing head 121 on a desired track on the magnetic disk 11 based on the head position control information.

On the other hand, the hard disk controller 32 reads data stored in the data buffer 33 to calculate error correction code (ECC). The hard disk controller 32 outputs user data, address information, or the calculated ECC to the read channel circuit 31.

The read channel circuit 31 produces writing data prepared by adding information for performing phase synchronization, output fixing, or the like to the data, the address information, or the ECC from the hard disk controller 32 to perform predetermined coding processing on the produced writing data, thereby producing a write signal recorded on the magnetic disk 11. The read channel circuit 31 outputs the writing signal to the head amplifier 13.

The head amplifier 13 changes a direction of a writing current flowing in the writing head 121 based on a bit of the writing signal to change a magnetization direction of the magnetic disk 11 and record data inputted from the host 5 on the magnetic disk 11.

When receives a reading instruction from the host 5, the hard disk controller 32 calculates a physical track position on the magnetic disk 11 from a logical address included in the reading instruction. The hard disk controller 32 outputs address information that is the calculated physical track position into the MCU 34.

The MCU 34 outputs head position control information moving the head to a position corresponding to a track number included in the address information to the SVC 35. The SVC 35 determines a current value for controlling the VCM 14 to move the VCM 14 and position the reading head 122 on a desired track on the magnetic disk 11 based on the head position control information.

The head amplifier 13 amplifies a magnetization waveform read from the magnetic disk 11 via the reading head 122 to produce a reading signal. The head amplifier 13 outputs the reading signal to the read channel circuit 31.

The read channel circuit 31 performs a predetermined decoding processing on the user data, the address information, and the ECC based on phase synchronization or the like to convert the same to NRZ (non-return to zero) data. The read channel circuit 31 outputs data and ECC in the NRZ data to the hard disk controller 32.

The hard disk controller 32 performs ECC arithmetic operation processing on the data and the ECC to correct data error and stores the data with the corrected data error in the data buffer 33 to output data stored in the data buffer 33 to the host 5 at a predetermined timing.

Thus, the magnetic disk apparatus 1 is controlled according to an instruction from the host 5 to perform writing of data on the magnetic disk 11 or perform reading of data written in the magnetic disk 11.

Figure 8:
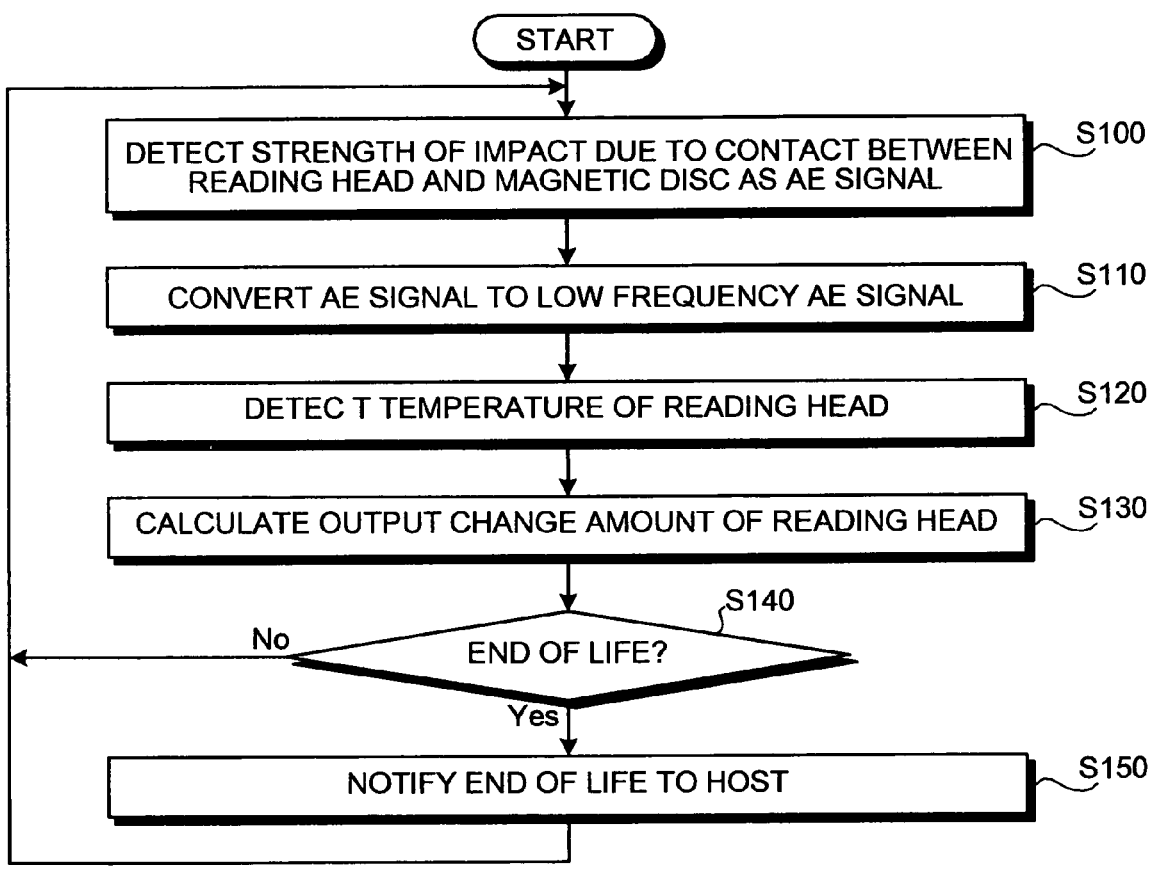
FIG. 8 is a flowchart of an operation of the magnetic disk apparatus according to the first embodiment.

An operation performed for estimating a life of the reading head 122 by the magnetic disk apparatus 1 will be explained with reference to a flowchart in FIG. 8. It is assumed that "0" is stored as an initial value for the accumulated value in the storage unit 364 at a start time of life estimation.

The contact impact detector 123 detects magnitude of an impact due to contact between the reading head 122 and the magnetic disk 11 as a high frequency AE signal (Step S100). The contact impact detector 123 outputs the detected AE signal to the signal converter 361.

The signal converter 361 converts the high frequency AE signal to a low frequency AE signal (Step S110). Specifically, the signal converter 361 performs an amplitude-demodulating process, a detection process that detects an envelope, a root-mean-square (RMS) conversion process, or the like on the AE signal to convert the high frequency AE signal to the low frequency AE signal. The signal converter 361 outputs the converted AE signal to the accumulating unit 362.

When receives the AE signal outputted from the signal converter 361, the accumulating unit 362 requested the temperature detector 124 to detect a temperature of the reading head 122. The temperature detector 124 detects a temperature of the reading head 122 (Step S120).

Specifically, the temperature detector 124 measures a resistance value of a reading element in the reading head 122. When a reference temperature is represented as Ta, a reference resistance value of the reading element in the reading head 122 at the reference temperature Ta is represented as Ra, and the temperature of the reading element in the reading head 122 is represented as Tread, a resistance R of the reading element measured is expressed as the following Eq. (16).

$$R=Ra(1+\alpha(Tread-Ta)) \quad (16)$$

where, $\alpha$ is a temperature coefficient of a resistor. The temperature Tread of the reading element in the reading head 122 is expressed according to Eq. (16), by $$Tread=(((R/Ra)-1)/\alpha)+Ta \quad (17)$$

The temperature detector 124 calculates the temperature of the reading element in the reading head 122 using Eq. (17) and notifies the calculated temperature of the reading element to the accumulating unit 362 as a temperature of the reading head 122.

The reference temperature Ta is an ambient temperature of the reading head 122 or a temperature inside the disk enclosure 10, and the reference resistance Ra is a resistance value when the temperature of the reading element in the reading head 122 is the reference temperature Ta. The temperature detector 124 measures the reference temperature Ta and the reference resistance Ra of the reading element at the reference temperature Ta during non-operation of the magnetic disk apparatus 1 at least one time.

However, since the reference resistance value Ra may change moderately in the long run, it is preferable that the resistance value of the reading head 122 is measured during non-operation of the magnetic disk apparatus 1 (while current is not caused to flow in the reading head 122 and the writing head 121, or while current is not caused to flow in the writing head 121 and the temperature Tread of the reading element in the reading head 122 can be regarded as equal to the reference temperature Ta) at predetermined time intervals and the latest measurement value is used as the reference resistance value Ra.

The accumulating unit 362 calculates an output change amount of the reading head 122 based on the AE signal outputted from the signal converter 361 and the temperature of the reading head 122 detected by the temperature detector 124 (Step S130). When the AE signal outputted from the signal converter 361 is represented as AE1, the absolute temperature of the reading head 122 detected by the temperature detector 124 is represented as Tgmr1, and the accumulated value stored in the storage unit 364 is represented as Y, Eq. (4) can be expressed by $$\Delta V/Vo \approx Y-AE1 \times a \times \exp(b \times Tgmr1) \quad (18)$$

The accumulating unit 362 calculates an output change amount of the reading head 122 using Eq. (18). That is, the accumulating unit 362 multiplies the exponential function of the absolute temperature of the reading head 122 by a value proportional to the AE signal converted into the low frequency that indicates magnitude of an impact to calculate the output change amount of the reading head 122. The output change amount calculated using Eq. (18) is an estimated value of a life of the reading head 122 based on the AE signal and the temperature of the reading head 122. The accumulating unit 362 stores the calculated output change amount in the storage unit 364 and outputs the same to the life estimating unit 363.

The life estimating unit 363 compares the output change amount calculated by the accumulating unit 362 and a predetermined allowable value of the output change amount of the reading head 122 with each other to determine whether the reading head 122 has reached the end of life (Step S140). As the result of comparison, when the output change amount is equal to or more than the allowable value, the life estimating unit 363 determines that the reading head 122 has reached the end of life and notifies such a fact to the host 5 (Step S150). As the comparison result, when the output change amount is smaller than the allowable value, the life estimating unit 363 determines that the reading head 122 has not reached the end of life yet, namely, it is still usable.

Thus, according to the first embodiment, considering that the output degradation rate of the reading head 122 is caused by magnitude of an impact due to contact between the reading head 122 and the magnetic disk 11 received by the reading head 122 and the temperature of the reading head 122, since such a constitution is employed that the life of the reading head 122 is estimated by detecting strengths of impacts due to contact between the reading head 122 and the magnetic disk 11 and temperatures of the reading head 122 and multiplying the exponential functions of the absolute temperatures of the heading head 122 by the values proportional to the strengths of impacts to accumulate the multiplied values, even if a floating amount of the reading head 122 is small and contact between the reading head 122 and the magnetic disk 11 frequently occurs, or an output change occurs due to a temporary environmental change, accumulative degradation influence degree from a start time of use of the reading head 122 can be measured properly so that the life of the reading head 122 can be estimated properly.

Furthermore, according to the first embodiment, since the signal converter 361 converts magnitude of an impact due to contact between the reading head 122 and the magnetic disk 11 to a low frequency signal, even if high frequency signals detecting strengths of impacts due to contact between the reading head 122 and the magnetic disk 11 are sampled at sparse intervals, the strengths of impacts due to contact can be accumulated properly and the life of the head can be estimated considering the strengths of impacts.

Moreover, according to the first embodiment, since it notifies the host 5 that the reading head 122 has reached the end of life when the life estimating unit 363 determines that the reading head 122 has reached the end of life, such a drawback can be prevented that reading error frequently occurs due to the end of life of the reading head 122 and the entire system is influenced by the reading error.

Furthermore, according to the first embodiment, since the accumulated value is stored in the storage unit 364, even if the information recording and reproducing apparatus is stopped and an operation thereof is then restarted, the life of the reading head 122 can be estimated properly considering the magnitude of an impact due to contact between the reading head 122 and the magnetic disk 11 and the temperatures of the reading head 122 that are measured continuously from an initial operation of the apparatus.

Moreover, according to the first embodiment, though the HGA 12 is provided with the contact impact detector 123, the contact impact detector 123 may be constituted to detect magnitude of an impact due to contact between the magnetic disk 11 and the reading head 122. For example, the contact impact detector 123 may be provided at an arm portion of the VCM 14 near to the HGA 12.

Furthermore, according to the first embodiment, such a constitution is employed that the output change amount calculated by the accumulating unit 362 is stored in the storage unit 364 and the output change amount stored in the storage unit 364 is used, when a new output change amount is calculated. However, such a constitution may be employed that the accumulating unit 362 also holds the output change amount and it calculates a new output change amount using the output change amount in a normal operation but the output change amount stored in the storage unit 364 is used only when calculation of another output change amount is restarted after the magnetic disk apparatus 1 is put in a stopped state.

Moreover, according to the first embodiment, though the output change amount is calculated using Eq. (3), it may be calculated using Eq. (5) or Eq. (7), and the absolute temperature Tgmr of the reading head 122 may be set in advance assuming that the temperature of the reading head 122 is fixed. In that case, the temperature detector 124 shown in FIG. 6 is removed and the previous Eq. (2) may be used instead.

Furthermore, according to the first embodiment, when the accumulated value, namely, the output change amount is equal to or more than the predetermined allowable value, the life estimating unit 363 determines that the reading head 122 has ended its life and notifies such a fact to the host 5. However, such a constitution may be employed that on reception of a request from the host 5, the life estimating unit 363 notifies the output change amount calculated by the accumulating unit 362 to the host 5. Thereby, it is made possible to monitor the state of the information recording and reproducing apparatus via the host 5, so that an operation efficiency of a system using the information recording and reproducing apparatus can be prevented from lowering due to reading error of data caused by the end of life of the reading head 122.

In general, respective constituent units in the information recording and reproducing apparatus are often controlled integrally by a CPU. In FIG. 6, the DCM 15, the VCM 14, and the head amplifier 13 are controlled by the MCU 34. The respective functions realized by the contact impact detector 123, the temperature detector 124, the signal converter 361, the accumulating unit 362, and the life estimating unit 363 according to the first embodiment are realized by a software (a program), so that they may be performed by the MCU 34 or the CPU.

Second Embodiment

Figure 9:
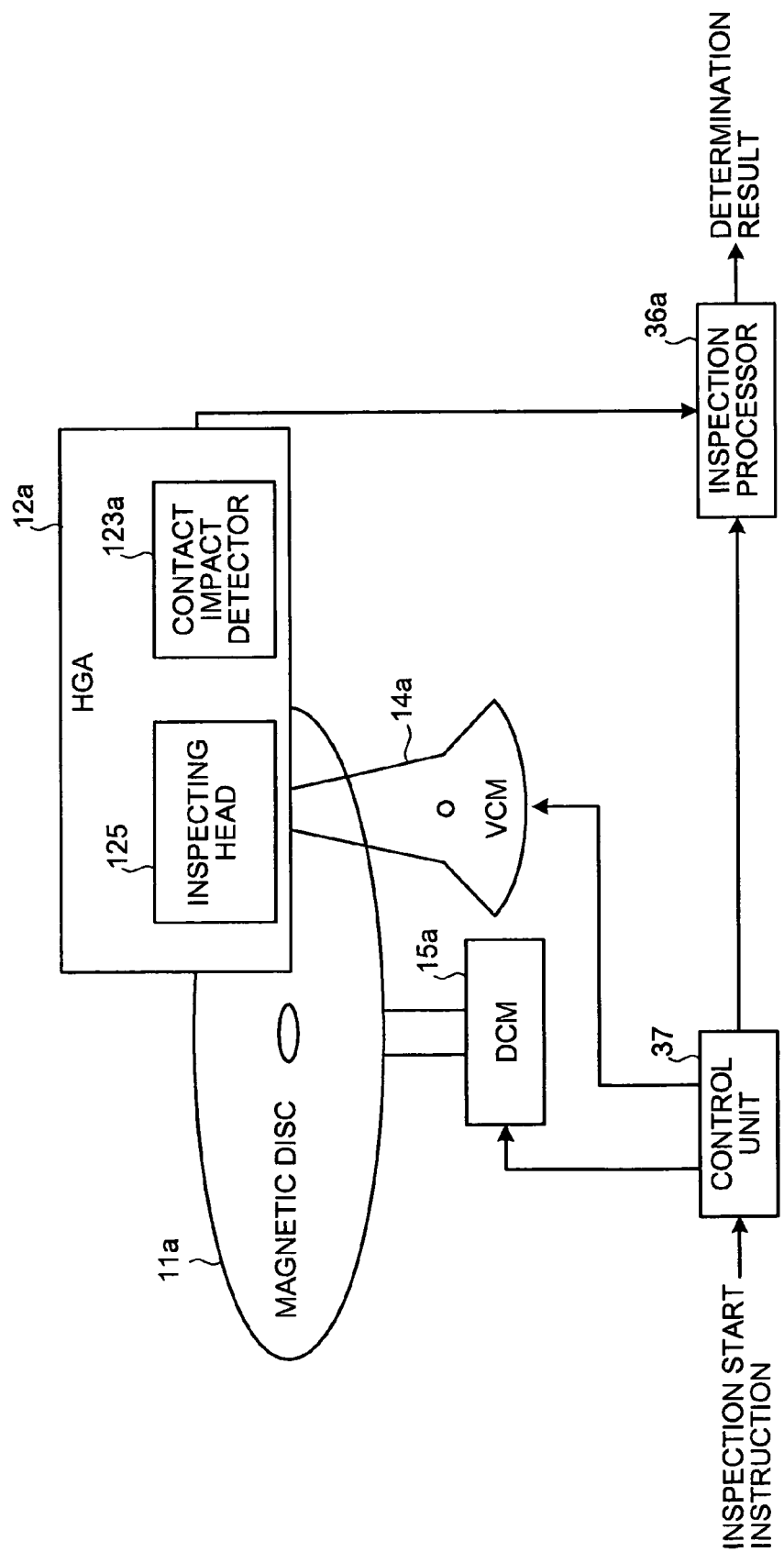
FIG. 9 is a block diagram of a magnetic disk inspecting apparatus according to a second embodiment of the present invention.

FIG. 9 is a block diagram of a magnetic disk inspecting apparatus that is a recording medium inspecting apparatus according to a second embodiment of the present invention. The magnetic disk inspecting apparatus shown in FIG. 9 includes a control unit 37 that integrally controls respective constituent units of the magnetic disk inspecting apparatus, a DCM 15a that rotates a magnetic disk 11a to be inspected, a VCM 14a that controls a position of an inspecting head 125, a HGA 12a having a contact impact detector 123a that detects magnitude of an impact due to contact between the inspecting head 125 and the magnetic disk 11a as a piezoelectric output signal, and an inspection processor 36a that makes determination about goodness and badness of the magnetic disk 11a.

Figure 10:
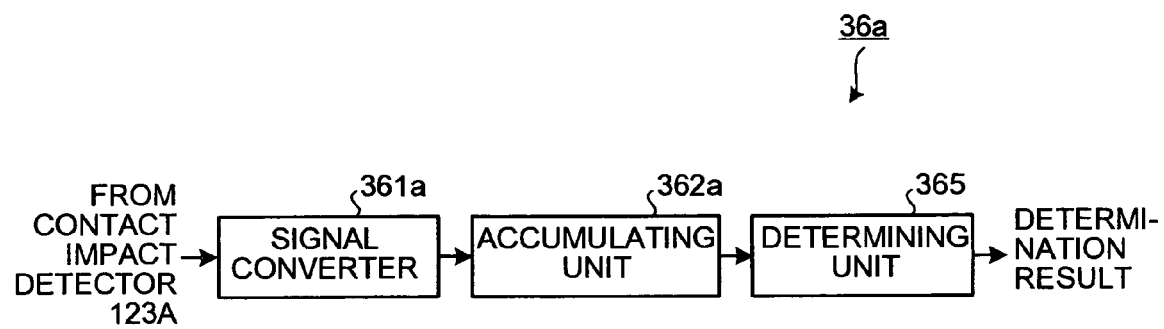
FIG. 10 is a block diagram of an inspection processor according to the second embodiment.

FIG. 10 is a block diagram of the inspection processor 36a shown in FIG. 9. The inspection processor 36a is provided with a signal converter 361a that converts a high frequency piezoelectric output signal outputted from the contact impact detector 123a to a low frequency signal, an accumulating unit 362a that accumulates low frequency piezoelectric output signals converted by the signal converter 361a, and a determining unit 365 that makes determination about goodness or badness of the magnetic disk 11a based on the accumulated value of the piezoelectric output signals accumulated by the accumulating unit 362a.

Figure 11:
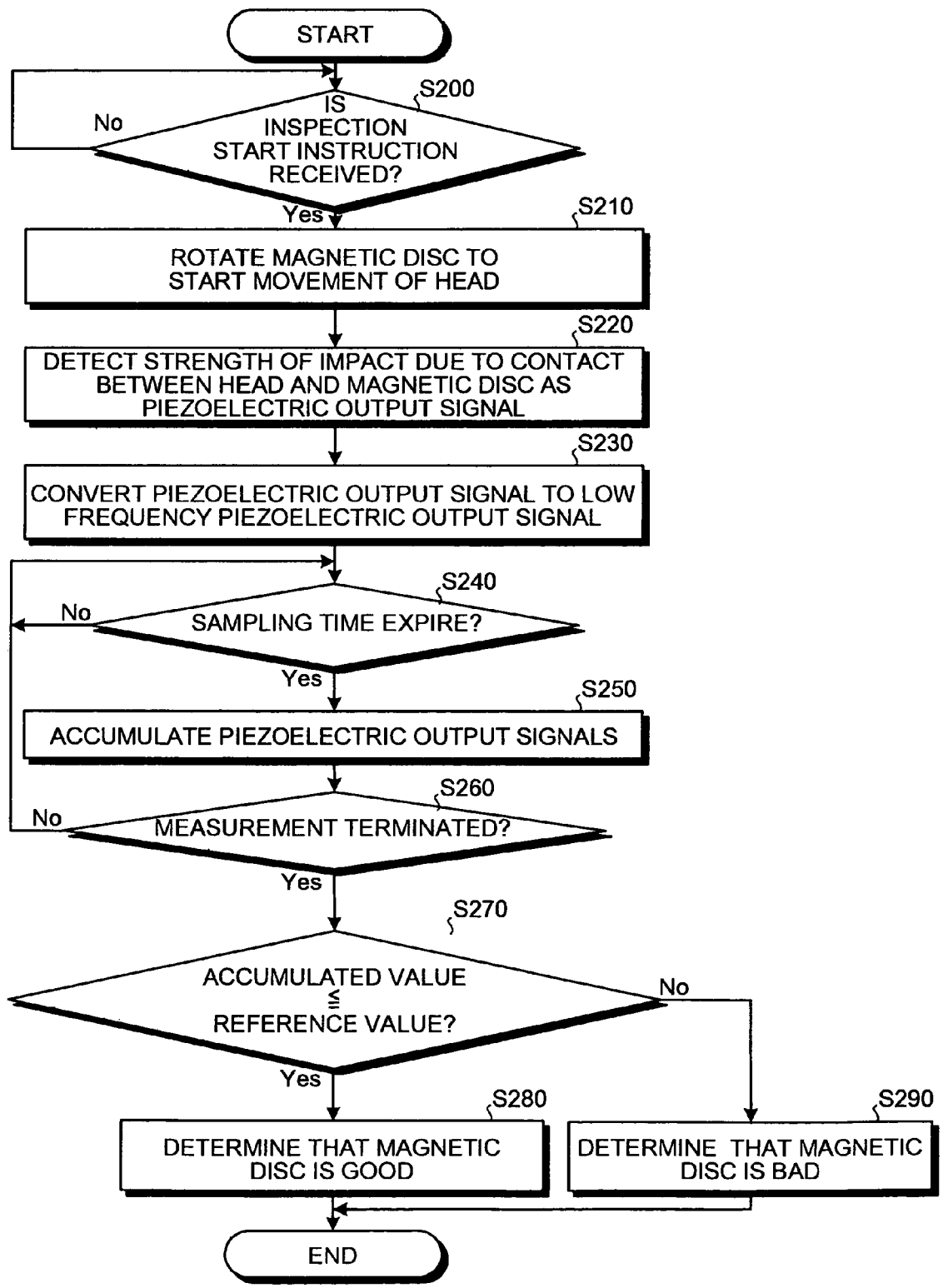
FIG. 11 is a flowchart of an operation of the magnetic disk apparatus according to the second embodiment.

An operation of the magnetic disk inspecting apparatus will be explained with reference to a flowchart shown in FIG. 11. The determining unit 365 is preliminarily set with a determination reference value calculated from Eq. (11), (13), or (15) using the use temperature, the life time (usable guarantee time), and the allowable value of the output change amount of the magnetic head used in combination with the magnetic disk 11a to be inspected.

When receives an inspection start instruction, the control unit 37 controls the DCM 15a and the VCM 14a to rotate the magnetic disk 11a and start movement of the inspecting head 125 (Steps S200 and S210). The control unit 37 controls the VCM 14a such that the inspecting head 125 moves to a predetermined radius position of the magnetic disk 11a from an outer periphery of the magnetic disk 11a to an inner periphery thereof or from the inner periphery to the outer periphery.

The control unit 37 notifies reception of the inspection start instruction to the inspection processor 36a and the inspection processor 36a performs an initial setting processing. The initial setting processing includes setting an initial value required for the signal converter 361a to convert a high frequency piezoelectric output signal detected by the contact impact detector 123a to a low frequency signal, setting of an initial value "0" into the accumulated value in the accumulating unit 362a, measurement start of a sampling time for performing accumulation, and the like.

The contact impact detector 123a detects magnitude of an impact due to contact between the inspecting head 125 and the magnetic disk 11a as a piezoelectric output signal (Step S220). The contact impact detector 123a outputs the detected piezoelectric output signal to the signal converter 361a.

The signal converter 361a converts a high frequency piezoelectric output signal to a low frequency piezoelectric output signal (Step S230). Specifically, the signal converter 361a performs an amplitude-demodulating process, a detection process that detects an envelope, an RMS converting processing, or the like on the piezoelectric output signal to convert the high frequency piezoelectric output signal to the low frequency piezoelectric output signal. The signal converter 361a outputs the converted piezoelectric output signal to the accumulating unit 362a.

The accumulating unit 362a accumulates a low frequency piezoelectric output signal outputted from the signal converter 361a to the previous accumulated signals for each sampling time (Steps S240 and S250). Specifically, the piezoelectric output signal outputted from the signal converter 361a is added to the accumulated value to calculate a new accumulated value and hold the calculated accumulated value.

The accumulating unit 362a repeats a processing that adds a low frequency piezoelectric output signal obtained by converting a high frequency piezoelectric output signal detected by the contact impact detector 123a in the signal converter 361a to the accumulated value to calculate a new calculated value for each sampling time until the accumulating unit 362a receives a notification of measurement termination (Steps S240 to S260). When movement of the inspecting head 125 to the predetermined radius position of the magnetic disk 11a is terminated, the notification of measurement termination is notified to the accumulating unit 362a by the control unit 37. After issuing the notification of measurement termination, the control unit 37 controls the DCM 15a to stop rotation of the magnetic disk 11a. When receiving the notification of measurement termination, the accumulating unit 362a outputs the accumulated value to the determining unit 365.

The determining unit 365 makes determination about goodness or badness of the magnetic disk 11a based on the accumulated value outputted from the accumulating unit 362a and the determination reference value (Step S270). Specifically, the determining unit 365 calculates a value of a piezoelectric output signal on a plane average of the magnetic disk 11a from the accumulated value, and compares the calculated value and the determination reference value with each other. When the calculated value is equal to or less than the determination reference value, the determining unit 365 determines that the magnetic disk 11a is good and outputs the determination result indicating that the magnetic disk 11a is good (Step S280).

When the calculated value exceeds the determination reference value, the determining unit 365 determines that the measured magnetic disk 11a is bad and outputs the determination result indicating that the magnetic disk 11a is bad (Step S290).

Thus, according to the second embodiment, since such a constitution is employed that strengths of impacts due to contact between the magnetic disk 11a and the head 125 are detected, the strengths of impacts detected are accumulated and a plane average of the strengths of impacts is calculated, and when a value of the plane average of the strengths of impacts calculated is smaller than the predetermined allowable value, the magnetic disk 11a is determined to be good, the magnetic disk 11a can be inspected considering that the magnetic disk 11a is used under such an environment that contact between the head 125 and the magnetic disk 11a frequently occurs due to reduction in floating amount of the head.

According to the second embodiment, since the signal converter 361a converts magnitude of an impact due to contact between the magnetic disk 11a and the head 125 to a low frequency signal, even if high frequency signals detecting strengths of impacts due to contact between the magnetic disk 11a and the head 25 are sampled at sparse intervals, the strengths of impacts due to contact can be accumulated properly and the magnetic disk 11a can be inspected considering the strengths of impacts.

In general, the control unit 37 that controls the DCM 15a and the VCM 14a is often constituted of a CPU or the like. The respective functions of the contact impact detector 123a, the signal converter 361a, the accumulating unit 362a, and the determining unit 365 according to the second embodiment are realized by a software (a program) and they may be implemented by a CPU.

Third Embodiment

Figure 12:
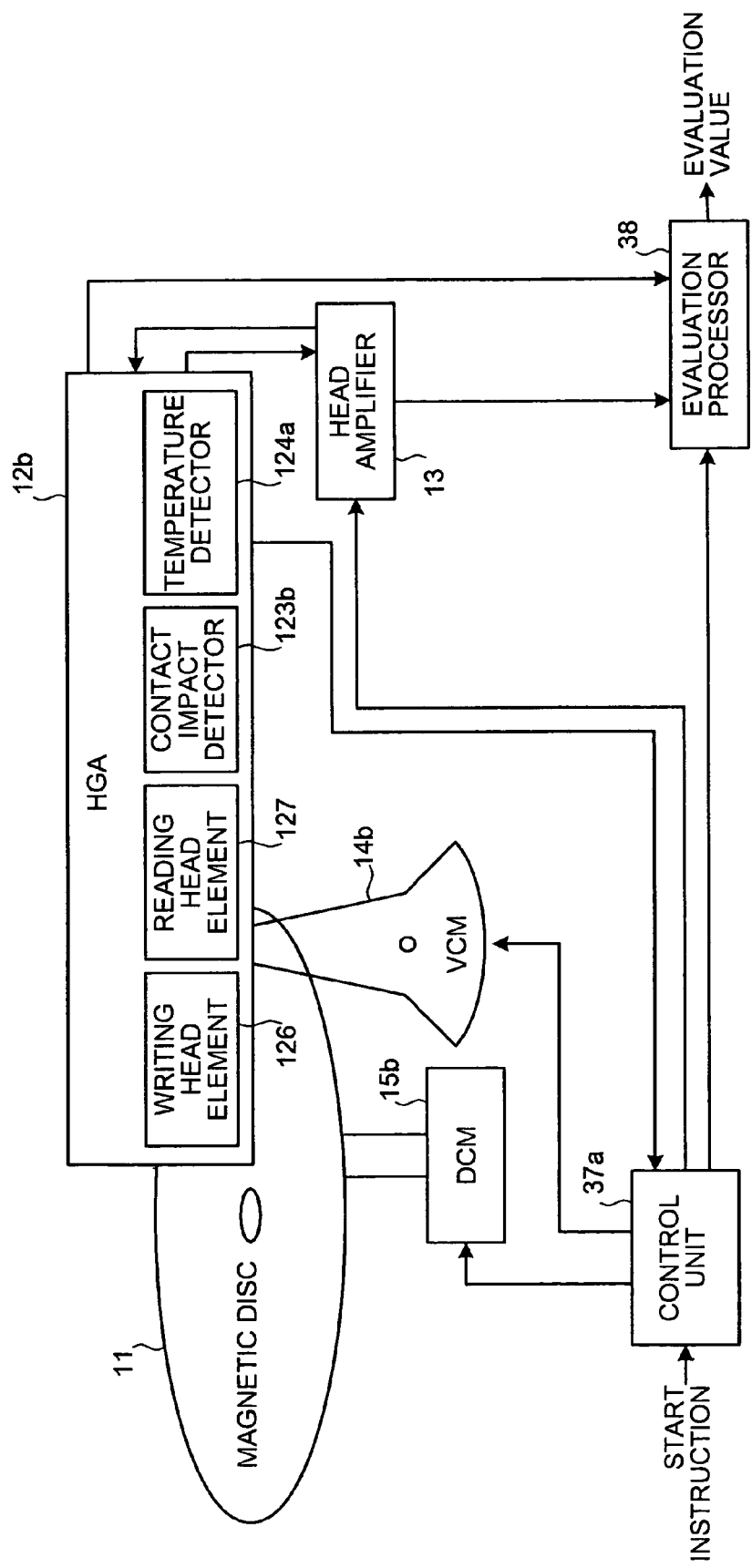
FIG. 12 is a block diagram of a magnetic-head evaluating apparatus according to a third embodiment of the present invention.

FIG. 12 is a block diagram of a magnetic-head evaluating apparatus according to a third embodiment of the present invention. The magnetic-head evaluating apparatus shown in FIG. 12 includes a control unit 37a that integrally controls respective constituent units of the magnetic-head evaluating apparatus and adjusts a temperature of the reading head element 127, a HGA 12b having a writing head element 126 that is constituted of an element for a magnetic head writing information in the magnetic disk 11, the reading head element 127 to be evaluated that is constituted of an element for a magnetic head reading information from the magnetic disk 11, a contact impact detector 123b that detects magnitude of an impact due to contact between the reading head element 127 and the magnetic disk 11 as an AE signal, and a temperature detector 124a that detects a temperature of the reading head element 127, a head amplifier 13 that controls a current supplied to the writing head element 126 and amplifies magnetization waveform of the reading head element 127, and an accumulating processor 38 that calculates an output change amount of the reading head element 127 and an accumulated value of the AE signals based on the AE signals detected by the contact impact detector 123b and the reading signals amplified by the head amplifier 13.

Figure 13:
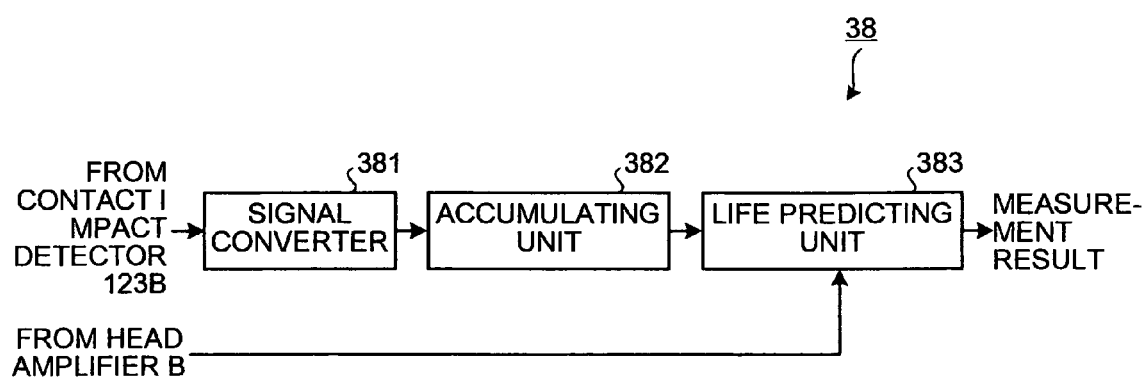
FIG. 13 is a block diagram of an evaluation processor according to the third embodiment.

FIG. 13 is a block diagram of the evaluation processor 38 shown in FIG. 12. The evaluation processor 38 is provided with a signal converter 381 that converts high frequency AE signals outputted from the contact impact detector 123b to low frequency signals, an accumulating unit 382 that accumulates the low frequency AE signals converted by the signal converter 381, and an evaluation value calculating unit 383 that calculates an output change amount based on read signals outputted from the head amplifier 13 and the accumulated value of the AE signals accumulated by the accumulating unit 382. A function for temperature control that controls a temperature of the reading head element 127 to a fixed value is realized by the temperature detector 124a, the head amplifier 13, and the control unit 37a.

Figure 14:
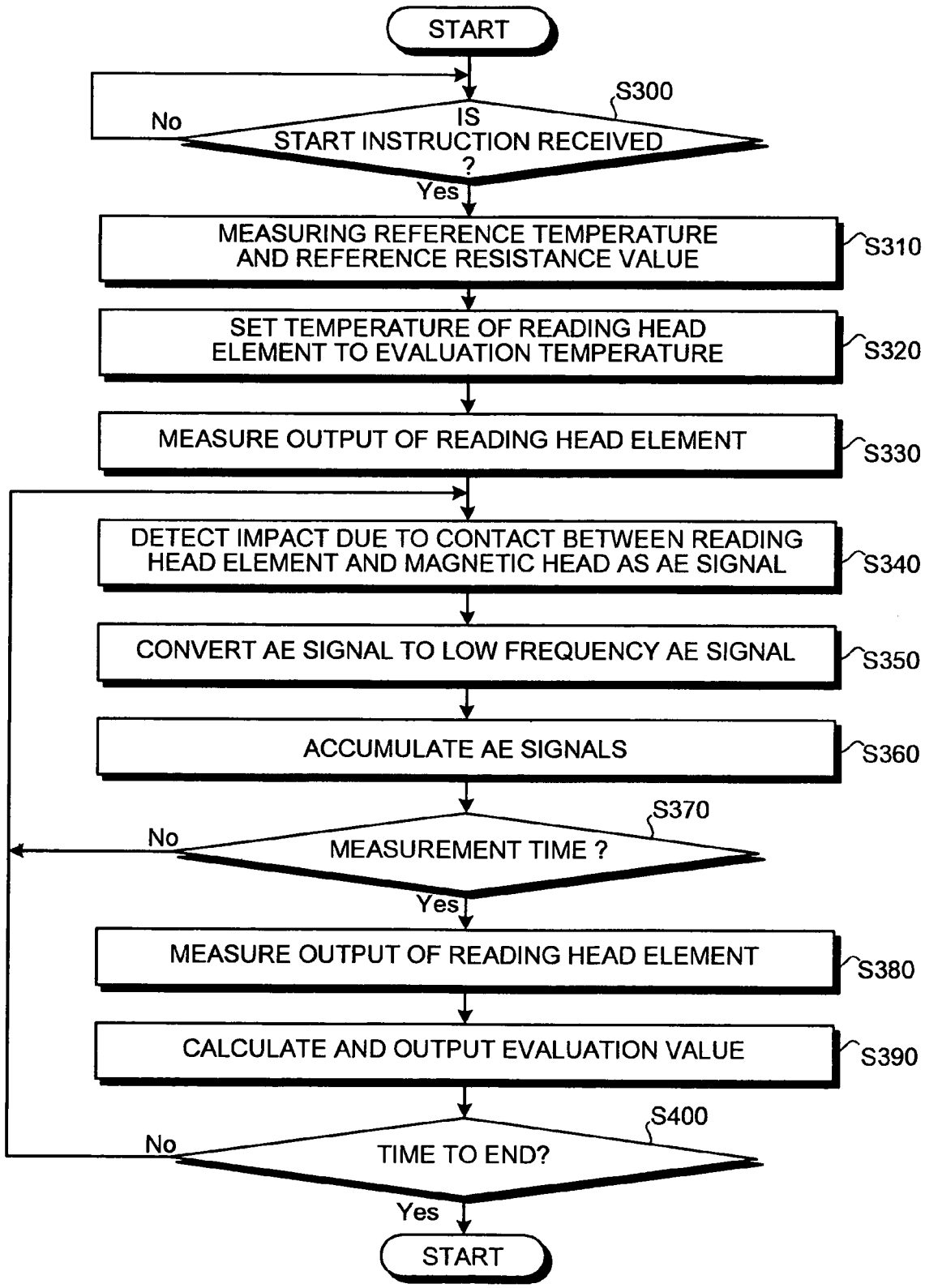
FIG. 14 is a flowchart of an operation of the magnetic-head evaluating apparatus according to the third embodiment.

An operation of the magnetic-head evaluating apparatus will be explained with a flowchart shown in FIG. 14. On reception of a start instruction (Step S300), the control unit 37 instructs the temperature detector 124a to measure a reference temperature and a reference resistance. The temperature detector 124a measures the reference temperature and the reference resistance (Step S310). The reference temperature is an ambient temperature of the reading head element 127 or a temperature inside the magnetic-head evaluating apparatus. The reference resistance is a resistant value obtained when no current flows in the writing head element 126 and the reading head element 127.

The control unit 37a sets the temperature of the reading head element 127 to an evaluation temperature (Step S320). Start instruction includes such evaluation conditions as an evaluation temperature of the reading head element 127, a measurement time of an output degradation amount of the reading head element 127, and an evaluation time. The control unit 37a controls a writing current flowing in the writing head element 126 via the head amplifier 13 such that the temperature of the reading head element 127 detected by the temperature detector 124a reaches the evaluation temperature. The control unit 37a monitors the temperature of the reading head element 127 detected by the temperature detector 124a during evaluation time and controls a writing current flowing in the writing head element 126 via the head amplifier 13 such that the temperature of the reading head element 127 always maintains the evaluation temperature. Since the operation of the temperature detector 124a for detecting a temperature of the reading head element 127 is the same as the operation explained regarding Step S120 according to the first embodiment, explanation thereof will be omitted.

The control unit 37a controls the VCM 14b to move the reading head element 127 to a predetermined track on the magnetic disk 11 and controls the DCM 15b to rotate the magnetic disk 11. The evaluation value calculating unit 383 measures an output of the reading head element 127 (Step S330). As an output of the reading head element 127, a read signal obtained by amplifying magnetization waveform that the reading head element 127 has read from the magnetic disk 11 by the head amplifier 13 may be used. The evaluation value calculating unit 383 holds the measured output of the reading head element 127 as an initial output.

The control unit 37a controls the VCM 14b to move the reading head element 127 to a tack different from a track applied for measuring the output of the reading head element 127. This is because a track (a track for output measurement) applied for measuring an output of the reading head element 127 is made different from a track (a track for AE detection) that gives an impact to the reading head element 127 by contact between the reading head element 127 and the magnetic disk 11 in view of such a fact that the magnetic disk 11 wears due to contact between the magnetic disk 11 and the reading head element 127. Hereinafter, when an output of the reading head element 127 is measured, the control unit 37a moves the reading head element 127 to the track for output measurement, and when an impact is imparted on the reading head element 127, the control unit 37a moves the reading head element 127 to the track for AE detection.

Since it becomes difficult to detect an AE signal according to advance of wearing of the magnetic disk 11, the control unit 37a reduces a floating amount of the reading head element 127 using a pressure reduction simultaneously, so that the number of contacts of the magnetic disk 11 and the reading head element 127 can be increased.

The contact impact detector 123b detects magnitude of an impact due to contact between the reading head element 127 and the magnetic head as an AE signal (Step S340). The contact impact detector 123b outputs the detected AE signal to the signal converter 381.

The signal converter 381 converts high frequency AE signals to low frequency AE signals (Step S350). The signal converter 381 outputs the converted AE signals to the accumulating unit 382. The accumulating unit 382 accumulates the low frequency AE signals outputted from the signal converter 381 (Step S360). The contact impact detector 123b detects magnitude of an impact due to contact between the reading head element 127 and the magnetic disk 11 as an AE signal, the signal converter 381 converts the AE signal detected by the contact impact detector 123b to a low frequency signal, and the accumulating unit 382 repeats an operation for accumulating AE signals converted by the signal converter 381 until the measurement time expires (Steps S340 to S370).

When the measurement time expires, the evaluation value calculating unit 383 measures an output of the reading head element 127 (Step S380). The evaluation value calculating unit 383 calculates an evaluation value based on the measured output of the reading head element 127, an initial output thereof, and the accumulated value of AE signals accumulated by the accumulating unit 382 and outputs the same (Step S390). The evaluation value is the output change amount of the reading head element 127, the output degradation coefficient, the accumulated value of the AE signals, or the like.

The accumulating unit 382 accumulates AE signals which have been converted to low frequency ones by the signal converter 381, and the evaluation value calculating unit 383 repeats an operation for calculating an evaluation value for each measurement time until the evaluation time expires or elapses (Steps S340 to S400). Further, such a constitution may be employed that, while changing the setting temperature of the reading head element 127, the accumulating unit 382 accumulates AE signals that have been converted to low frequency ones by the signal converter 381 and the evaluation value calculating unit 383 repeats an operation for calculating an evaluation value for each measurement time until the evaluation time expires or elapses (Steps S340 to S400).

Thus, according to the third embodiment, from a view point that the output degradation coefficient is the function of the temperature of the reading head element 127, since the temperature of the reading head element 127 is fixed, the output degradation coefficient is calculated from the magnitude of an impact due to a contact between the reading head element 127 and the magnetic disk 11, and an output and an initial output of the reading head element 127 measured, and the calculated output degradation coefficient is used as the evaluation value, durability of the head, which is made of different kinds of materials or have different structures, to magnitude of an impact due to contact between the heads and a recording medium can be evaluated properly.

Furthermore, according to the third embodiment, since the signal converter 381 converts magnitude of an impact due to contact between the reading head element 127 and the magnetic disk 11 that has been detected by the contact impact detector 123b to a low frequency signal, even if high frequency signals detecting strengths of impacts due to contact between the reading head element 127 and the magnetic disk 11 are sampled at sparse intervals, the strengths of impacts due to contact can be accumulated properly and the evaluation value can be calculated.

Moreover, according to the third embodiment, though the HGA 12b is provided with the contact impact detector 123b, the contact impact detector 123b may be constituted to detect magnitude of an impact due to contact between the magnetic disk 11 and the reading head element 127. For example, the contact impact detector 123b may be provided at an arm portion of the VCM 14b near to the HGA 12b.

In general, the control unit 37a that controls the head amplifier 13, the DCM 15b and the VCM 14b is often constituted of a CPU or the like. The respective functions of the contact impact detector 123b, the temperature detector 124a, the signal converter 381, the accumulating unit 382, and the evaluation value calculating unit 383 according to the third embodiment are realized by a software (a program) and they may be implemented by a CPU.

According to the present invention, since magnitude of an impact due to contact between the head and the recording medium is detected and a life of the head is estimated based on the magnitude of an impact detected, a life estimating method of a head can be obtained that can estimate a life of a head properly even if a floating amount of the head is reduced and contact between a head and a recording medium frequency occurs.

Furthermore, according to the present invention, since strengths of impacts due to contacts of the head and the recording medium is accumulated, a life estimating method of a head can be obtained that can estimate a life of a head considering all the strengths of impacts due to contacts of a head and a recording medium.

Moreover, according to the present invention, since a temperature of the head is detected and the life of a head is estimated based on the temperature of head detected and the magnitude of an impact due to contact between the head and the recording medium, a life estimating method of a head can be obtained that can estimate a life of a head properly considering not only the magnitude of an impact due to contact between a head and a recording medium but also a temperature of the head.

Furthermore, according to the present invention, since the temperature of the head is detected and the strengths of impacts due to contacts of the head and the recording medium are accumulated, a life estimating method of a head can be obtained that can estimate a life of a head considering all the strengths of impacts due to contacts of a head and a recording medium and the temperatures of the head.

Moreover, according to the present invention, since an exponential function or an exponentiation function of the absolute temperature of the head is multiplied by a value proportional to the magnitude of an impact due to contact between the head and the recording medium, a life estimating method of a head can be obtained that can estimate a life of a head considering all the strengths of impacts due to contacts of a head and a recording medium and the temperatures of the head.

Furthermore, according to the present invention, since the magnitude of an impact due to contact between the head and the recording medium is converted to the low frequency signal, a life estimating method of a head can be obtained that, even if high frequency signals detecting strengths of impacts due to contact between a head and a recording medium are sampled at sparse intervals, accumulates the strengths of impacts due to contact properly to estimate a life of a head considering the strengths of impacts.

Moreover, according to the present invention, since the accumulated value of the strengths of impacts due to contact between the head and the recording medium is stored, a life estimating method of a head can be obtained that, even if use of a head is interrupted, can accumulate strengths of impacts due to contact between a head and a recording medium continuously from a start time of use of the head to estimate a life of the head.

Furthermore, according to the present invention, since strengths of impacts due to contact between a recording medium and a head are detected and the strengths of impacts detected are accumulated, a recording medium inspecting method can be obtained that can determine whether a recording medium is good or bad considering all strengths of impacts due to contact between a head and the recording medium.

Moreover, according to the present invention, since magnitude of an impact due to contact between a head and a recording medium is detected and an evaluation value indicating durability of the head using the magnitude of an impact detected is calculated, a head evaluating method can be obtained that can evaluate the durability of the head, which is made of different kinds of materials or have different structures, to magnitude of an impact due to contact between the heads and a recording medium properly.

Furthermore, according to the present invention, since magnitude of an impact due to contact between a head and a recording medium is detected and a life of the head is estimated based on the magnitude of an impact detected, an information recording and reproducing apparatus can be obtained that, even if contact between the head and the recording medium frequently occurs due to that a floating amount of the head becomes small, can estimate a life of the head properly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of estimating life of a head that reads information recorded in a recording medium, the method comprising:
    detecting magnitude of an impact due to a contact between the head and the recording medium;
    detecting temperature of the head; and
    estimating the life of the head based on the magnitude of the impact detected and the temperature detected.

2. The method according to claim 1, wherein
    the detecting detects a plurality of magnitudes of a plurality of impacts; and
    the estimating includes
        accumulating the magnitudes of the detected impacts; and
        estimating the life of the head based on the accumulated magnitudes.

3. The method according to claim 2, wherein
    the estimating further includes converting the magnitudes of the impacts detected into low frequency signals, and
    the accumulating includes accumulating the converted low frequency signals.

4. The method according to claim 2, further comprising:
    storing values representing the results of the accumulating.

5. The method according to claim 1, wherein
    the detecting detects a plurality of magnitudes of a plurality of impacts and temperatures of the head; and
    the estimating includes
        performing arithmetic operations using the magnitudes of the impacts detected and the temperatures detected;
        accumulating results of the arithmetic operations; and
        estimating the life of the head based on the accumulated results.

6. The method according to claim 1, wherein the detecting includes detecting the magnitude of the impact using an acoustic emission signal.

7. The method according to claim 1, wherein the head is either of a giant-magneto-resistive head using giant-magneto-resistive effect and a tunneling-magneto-resistive head using ferromagnetic tunneling effect.

8. A method of inspecting a recording medium by rotating the recording medium on which information is recorded and moving a head, which is floating or sliding on the recording medium at a distance from a surface of the recording medium, to a position on the recording medium, the method comprising:
    detecting magnitude of an impact between the head and the recording medium;
    accumulating the magnitude of the impact detected; and
    determining whether the recording medium is good, based on the accumulated magnitude of the impact.

9. The method according to claim 8, further comprising:
    converting the magnitude of the impact detected into a low frequency signal,
wherein
    the accumulating includes accumulating the converted low frequency signal.

10. The method according to claim 9, wherein the converting includes performing an amplitude-demodulation processing, a detection processing that detects an envelope, or a root-mean-square conversion processing on a signal indicating the magnitude of the impact detected to conduct a conversion into the low frequency signal.

11. The method according to claim 8, wherein the accumulating includes
    sampling the magnitude of the impact; and
    accumulating the magnitude of the impact sampled.

12. The method according to claim 8, wherein
    the detecting includes detecting the magnitude of the impact using a piezoelectric element, and
    an output signal from the piezoelectric element is used as the magnitude of an impact.

13. A method of evaluating durability of a head by floating or sliding the head on a recording medium under rotation at a distance from a surface of the recording medium, the method comprising:
    detecting magnitude of an impact between the head and the recording medium; and
    an evaluation process including
        measuring an output from the head at a time interval; and calculating an evaluation value indicating the durability of the head, based on the measured output, an initial output value of the head, and the detected magnitude of the impact.

14. The method according to claim 13, further comprising: monitoring temperature of the head to control the temperature to a specified value.

15. The method according to claim 13, wherein the evaluation process further includes
    accumulating the magnitude of the detected impact; and
    calculating an amount of output change and an output degradation coefficient of the head as the evaluation value, based on the output measured, an initial value associated with the head, and the magnitude of the impact accumulated.

16. The method according to claim 15, wherein
    the evaluation process further includes converting the magnitude of the detected impact into a low frequency signal, and
    the accumulating includes accumulating the converted low frequency signal.

17. The method according to claim 13, wherein the detecting includes detecting the magnitude of the impact using an acoustic emission signal.

18. The method according to claim 13, wherein the head is either of a giant-magneto-resistive head using giant-magneto-resistive effect and a tunneling-magneto-resistive head using ferromagnetic tunneling effect.

* * * * *